United States Patent [19]

Sanders

[11] Patent Number: 4,846,608
[45] Date of Patent: Jul. 11, 1989

[54] PNEUMATIC GRAIN CONVEYOR AND RELATED METHOD

[76] Inventor: Kenneth L. Sanders, R.R. #1, Box 83B, Plano, Ill. 60545

[21] Appl. No.: 471,030

[22] Filed: Mar. 1, 1983

[51] Int. Cl.⁴ .............................................. B65G 53/58
[52] U.S. Cl. .................... 406/144; 406/130; 406/173; 406/175; 222/82
[58] Field of Search ............ 406/144, 171, 173, 154, 406/146, 130, 175; 222/82, 637, 105

[56] References Cited

U.S. PATENT DOCUMENTS

| | | | |
|---|---|---|---|
| 824,056 | 6/1906 | Akers . | |
| 1,881,507 | 10/1932 | Gredell | 406/154 X |
| 2,631,899 | 3/1953 | Jullien . | |
| 2,827,333 | 3/1958 | Wallin . | |
| 3,035,737 | 5/1962 | Speas | 222/82 |
| 3,149,884 | 9/1964 | Jones | 406/144 X |
| 3,155,431 | 11/1964 | Baldwin . | |
| 3,384,420 | 5/1968 | Fiscus | 406/173 |
| 3,574,409 | 4/1971 | Furstenberg . | |
| 3,705,710 | 12/1972 | Mueller | 406/80 X |
| 4,098,541 | 7/1978 | Cote | 406/146 |
| 4,147,392 | 4/1979 | Fuss | 406/144 X |
| 4,280,419 | 7/1981 | Fischer . | |
| 4,284,032 | 8/1981 | Moos et al. . | |

FOREIGN PATENT DOCUMENTS 899416 5/1972 Canada .............................. 406/154

*Primary Examiner*—Joseph F. Peters, Jr.
*Assistant Examiner*—James M. Kannofsky
*Attorney, Agent, or Firm*—R. A. Blackstone, Ltd.

[57] ABSTRACT

A pneumatic conveyor and related method for seeds or other particulate matter comprises a cyclone or vortex type discharge device, a blower for supplying a flow of air, a conduit coupled to the blower and to the discharge device for supplying a flow of air thereto, the conduit being primarily a flexible conduit, and a venturi in the conduit for pneumatic coupling to a supply of seeds whereby the seeds may be withdrawn from a supply container into the venturi for transport with the air stream to the discharge device. The venturi is connected to the container by a component that comprises a slide gate closure between the opening of the container and the intake of the venturi.

3 Claims, 3 Drawing Sheets

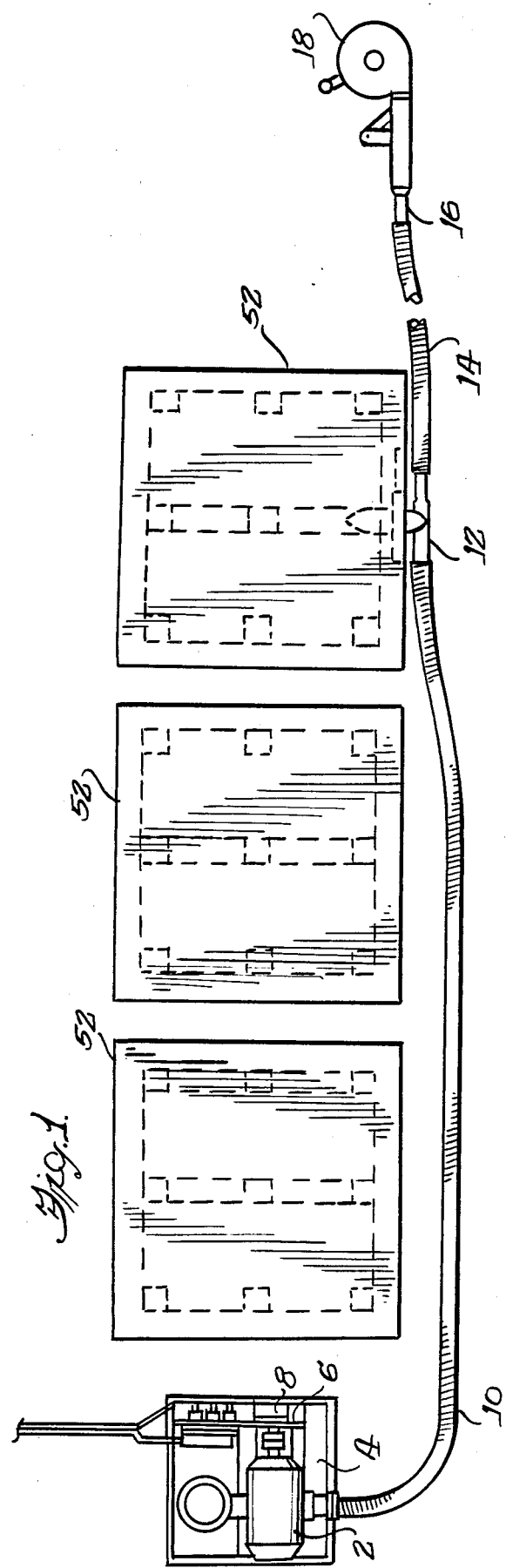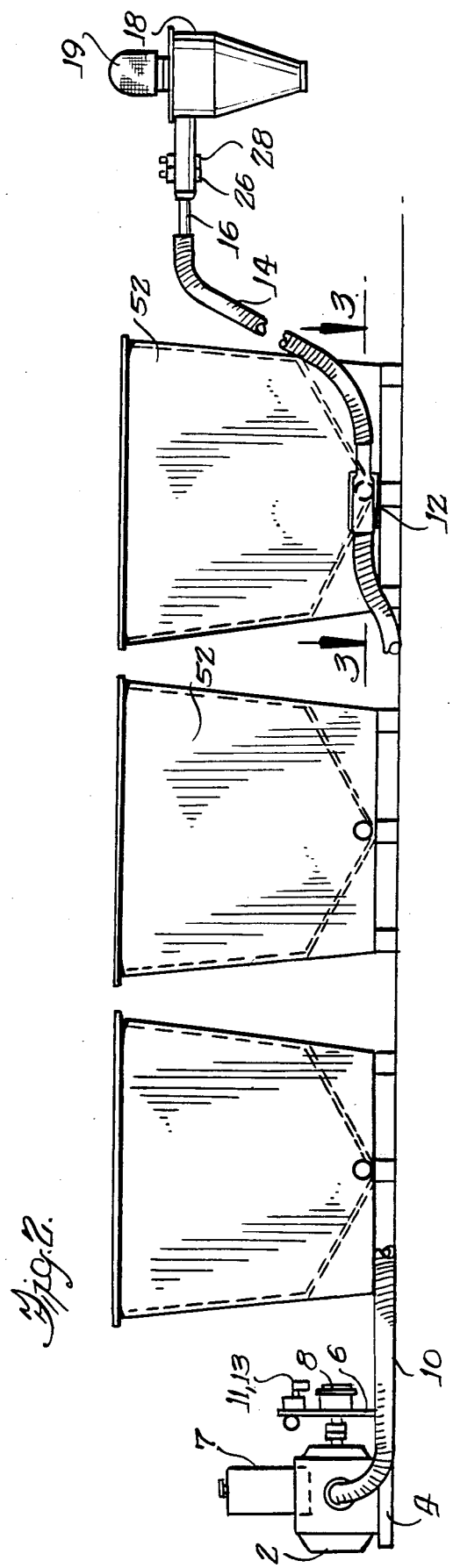

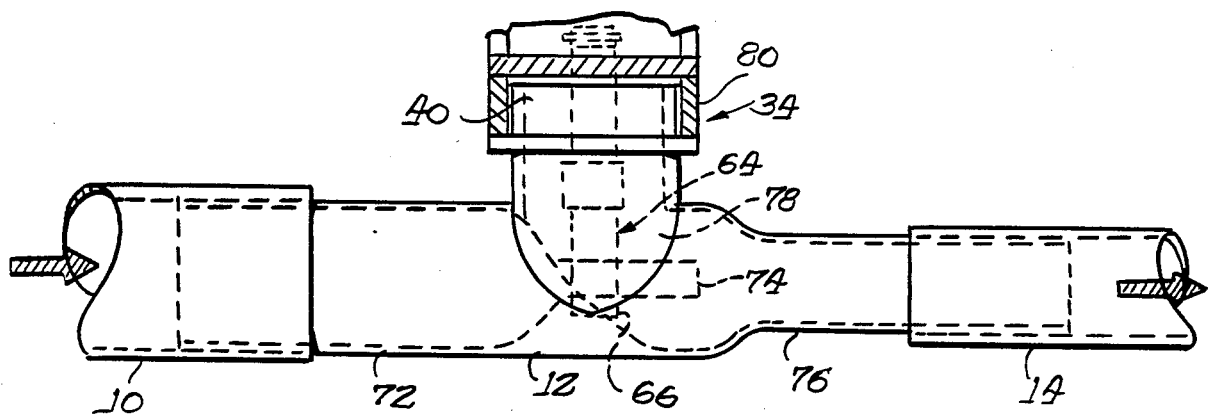
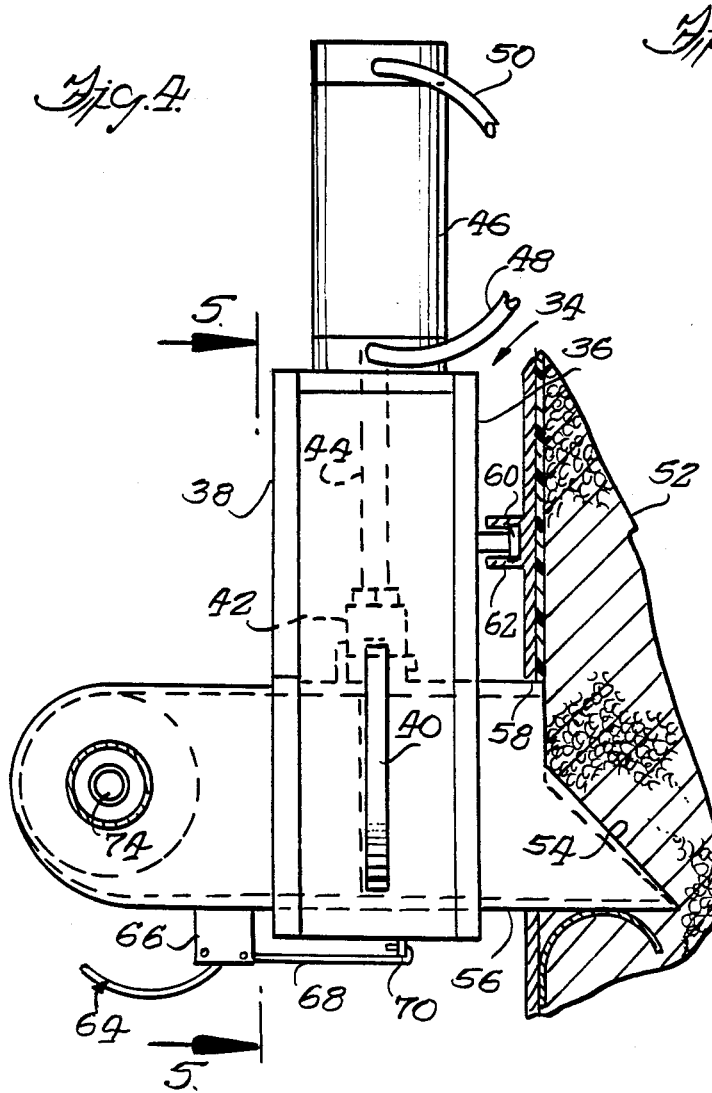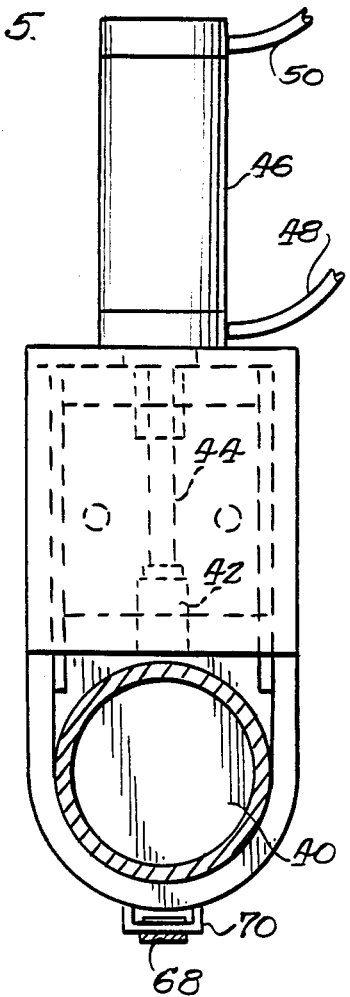

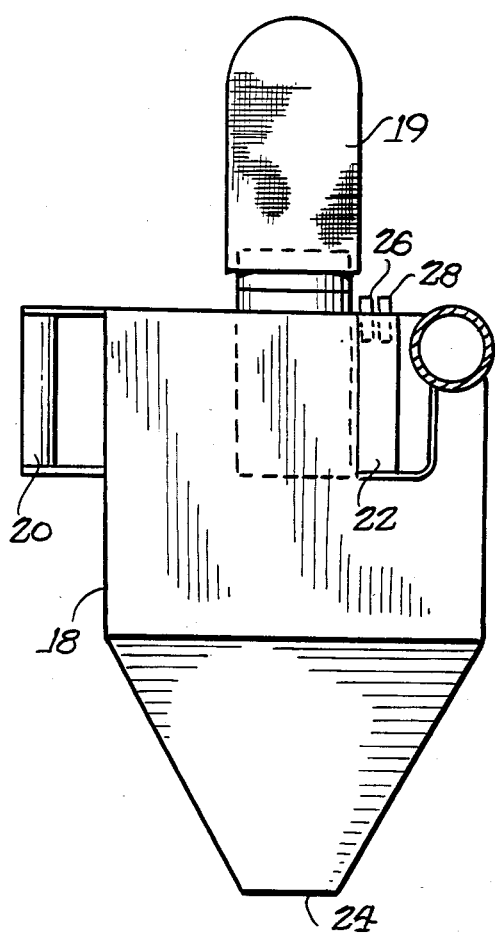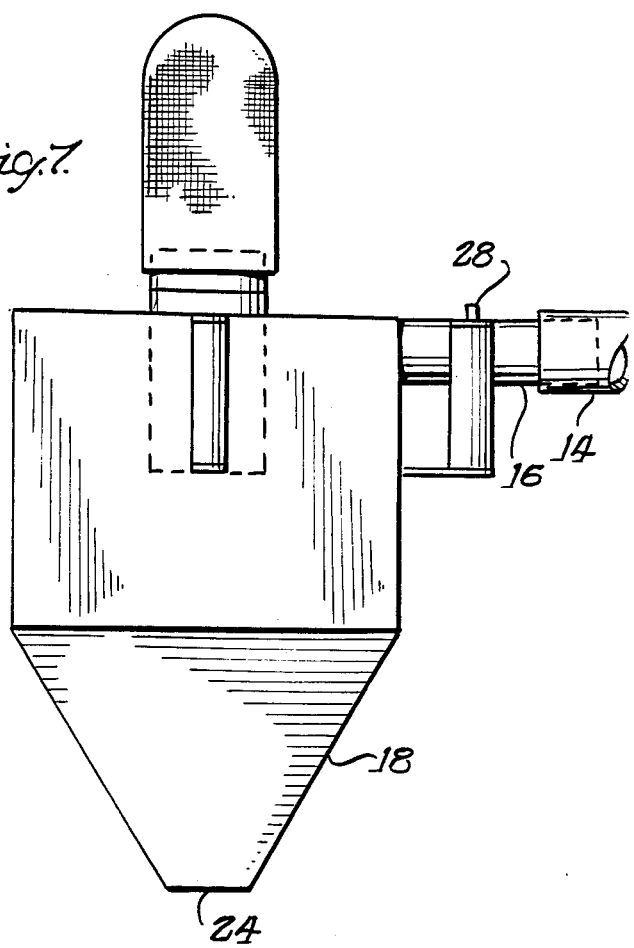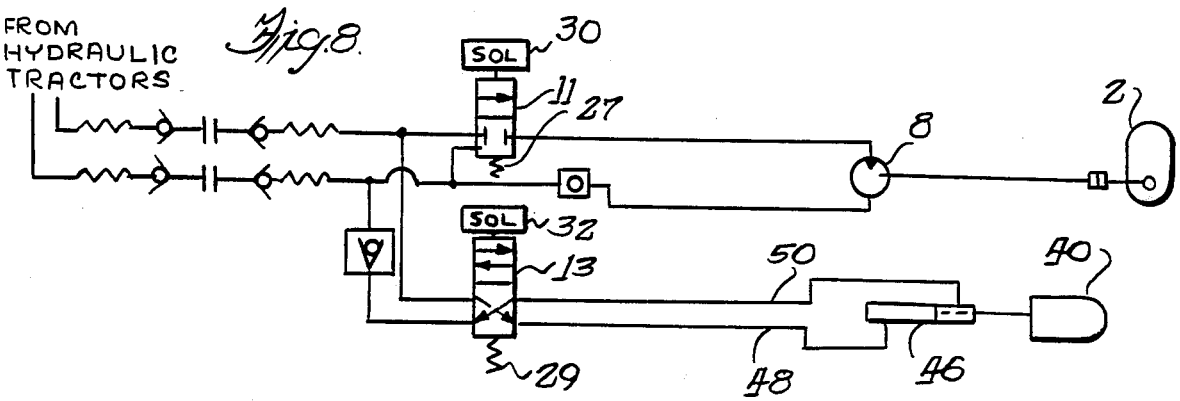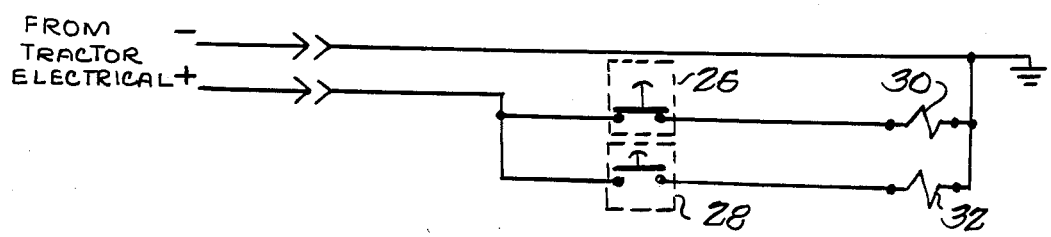

PNEUMATIC GRAIN CONVEYOR AND RELATED METHOD

This invention relates to improvements in pneumatic conveyors, more particularly conveyors of the type used for transporting particulate matter such as seeds from a storage bin to a planter.

In the handling of seed corn or soybean seed, for example, there is a problem in loading the seeds into the planting machine. The problem has to do with time consumption and the fatigue associated with the handling of seed in 50 pound bags, which is basically how the industry packages the product. In prior years, this was not a problem when the farmer was utilizing two- and four-row planters, and was farming a relatively few number of acres. In the mechanized agriculture of today, there are a large number of farmers that are farming a thousand acres or more, and under these circumstances, the handling of considerably larger quantities of seed is required. For example, if a farmer is farming one thousand acres and is planting 60% corn and 40% soybeans, the farmer will be using about 600 bags of seed, of which 400 bags will be soybean and 200 bags will be seed corn.

In a typical planting day involving planting of corn, and assuming that the farmer has an 8-row planter, it will be necessary to recharge the planter about three times. On each recharge, the farmer will be carrying 16 bags from his pickup truck or other storage medium to the planter. Each bag must be torn open and poured into the planter. When soybeans are being planted, the farmer will anticipate the need to have one bushel of seed for one acre being planted. Under those circumstances, the soybean planter will be recharged somewhere near nine times a day, with the result that a great deal of time and fatigue is involved in simply charging the planter.

Broadly speaking, pneumatic conveyors have been used for transporting particulate matter, but many of these conveyors are either too complex, too bulky or otherwise unsuitable for agricultural use in the field.

An object of this invention is to provide a conveyor of the type stated and a related method which eliminates the need for heavy and cumbersome components, whereby the pneumatic conveyor of the present invention is able to lighten up considerably the total weight of the system so that it is essentially portable in nature.

A further object of this invention is to provide a pneumatic conveyor of the type stated and related method which is relatively easy to use and cuts down considerably the time required for loading of seed from a storage bin into a planter.

Another object of this invention is to provide a pneumatic conveyor of the type stated which uniquely utilizes a venturi in a pressurized pneumatic line for the purpose of withdrawing the particulate matter from the storage area and injecting the material into the air line for transport to the conveyor discharge device.

A still further and important object of this invention is to provide a conveyor of the type stated which is removably mounted in a removable manner onto a storage container by means of a component or unit which provides a hydraulically actuated slide gate between the venturi and the outlet opening of the storage container.

Generally speaking, the invention comprises a method and apparatus that utilizes air pressure to convey seed from a storage container to the planter boxes on the planter unit. The storage containers may be carried on a vehicle and are designed to hold up to 1500 pounds of material and are compatible with the conveyor unit itself. The system utilizes air pressure created by a positive displacement blower located at one end of a flexible pneumatic line and driven by a hydraulic motor. A venturi serving as a product entry unit is positioned in the flexible line between the blower and a hand-held cyclone or vortex type of discharge device from which the seed is charged into the planter box. The discharge device has control switches to stop and start the hydraulic motor that powers the blower and also to actuate the aforementioned slide gate which is mounted on the container and which serves to mount the venturi in proper position relative to the discharge opening of the container. The control switches operate solenoid valves at a central unit.

The container or containers, as the case may be, are designed to accept the gate mechanism by removing a plastic plug or section in the container and then inserting the gate unit with a twisting motion, thus cutting a plastic bag or liner in the container. At the same time, the gate unit is secured to the container by two locking pins which engage in locking receptacles attached to the container. The venturi is designed to be inserted into the discharge side of the gate mechanism and held in place by means of a toggle clamp. The conveying or discharge rate of the material from the container is controlled by the size of the outlet in the container as may be determined by the position of the gate. The conveying rate may also be determined by the speed of the hydraulic motor and hence the speed of the blower. Preferably the hydraulic and electric power is supplied by means of quick disconnect couplings at the outlet power supply of the tractor that is being used to pull the planter.

IN THE DRAWINGS

FIG. 1 is a top plan view of a conveyor system constructed in accordance with and embodying the present invention;

FIG. 2 is an elevational view thereof;

FIG. 3 is a fragmentary enlarged sectional view taken approximately along line 3—3 of FIG. 2;

FIG. 4 is a side elevatonal view of the structure of FIG. 3;

FIG. 5 is a fragmentary sectional view taken approximately along line 5—5 of FIG. 4;

FIG. 6 is a side elevational view of the discharge device forming part of the present invention;

FIG. 7 is a top plan view of the discharge device;

FIG. 8 is a schematic of the hydraulic circuit of the present invention;

FIG. 9 is a schematic of the electrical circuit of the present invention.

Referring now in more detail to the drawing, there is shown a pneumatic conveyor comprising a blower 2 that is mounted upon a support plate 4 upon which there is also mounted an upstanding bracket 6. Also mounted on the bracket 6 is a hydraulic motor 8 and control valves 11, 13 which are solenoid actuated, as will be presently more fully described. The hydraulic motor 8 is directly coupled to the blower 2 that includes intake filter 7.

The discharge side of the blower 2 is coupled to a flexible pneumatic tube or line 10, and the end of the line 10 remote from the blower 2 is connected to the inlet side of a venturi 12. The outlet side of the venturi 12 is connected to a flexible conduit or line 14 which is, in turn, connected to the inlet 16 of a discharge device or "unloading cyclone" 18.

The device 16 is hand-held by a pair of handles 20, 22 that are approximately 90 degrees apart. The mixture of the material being conveyed in the air stream enters at the inlet side 16 and the material is thrown out to the periphery of the device while the air expands to some extent and at the same time separates from the material. Since the material is heavier than air, it drops downwardly by gravity through the discharge port 24 while the air escapes out of the top of the device through filter 19. This arrangement serves two functions. The first function is to decelerate the material so that there is a minimum amount of injury to the product. Secondly, the air is allowed to escape into the atmosphere. The two operating handles 20, 22 are gripped by the operator with ready access to control switches 26, 28. These switches 26, 28 control the operation of the valve 10, 12 through solenoids 30, 32, as will presently be more fully described. Control wires run from the switches 26, 28 along the flexible lines 10, 14 back to the control valves 11, 13.

Referring now more particularly to FIGS. 3–5, it will be seen that there is a control gate assembly 34 which is utilized to mount the venturi 12 and also importantly to control the flow of material into the conveying system. This hydraulic slide gate assembly comprises an inlet component 36, an outlet component 38 and a gate unit 40 that slides between the units 36, 38 when those two units are bolted together. Attached to the gate 36 is a yoke 42 which is, in turn, connected to a piston rod 44, the upper end of which has a piston that slides within a cylinder 46. The cylinder 46 has inlet lines 48, 50. Charging the inlet line 46 with fluid causes the gate to be raised; charging the inlet line 50 with hydraulic fluid causes the gate to be lowered. In its lowered position, the gate 40 cuts off the supply of seed from the container 52 to the venturi 12. The inlet component 34 is provided with a sharp cutting edge 54 extending just beyond the center line of the tubular portion 56 and serves the purpose of cutting a plastic bag or liner within the container 52 as the assembly 34 is mounted over the outlet hole 58 in the container 52. During such mounting, the locking pins 60 are inserted into slots in mounting ribs 62 on the outside face of the wall of the container 52 following which the unit 34 is twisted or rotated a small amount.

The outlet side of the unit 34 is designed to telescope with the inlet side coupling 80 of the venturi 12, and the venturi is held in place by a conventional type toggle clamp 64 that is mounted upon a bracket 66. For this purpose, the toggle clamp has an arm 68 that engages a ring 70 at the lower side of the unit 34.

A feature of this invention lies in the fact that it is possible to position the particulate material in such a way as to be ready to enter the system through the venturi without at the same time losing material onto the ground. By cutting the plastic bag or liner in the storage container 52 by the cutting edge 54 with the gate in the closed position, the material is ready to be released into the system without any loss due to spillage.

Referring now to the venturi 12 it will be noted that this component enables one to achieve a smooth flow of material from the storage container into the conveyor. The venturi comprises a tube 72 at the air inlet side, and this tube has a neck down section 74 to provide a small orifice within the larger tube 76. The neck down or restriction 74 causes the air flowing therethrough to be discharged from the tube 74 at a lower pressure than will be found at the peripheral region 78 of the tube 76. This region 78 corresponds to the discharge portion of the coupling section 80 of the venturi, which coupling section 80 fits into the slide gate assembly 34.

The use of the venturi unit of the type herein described is significant in the seed conveyor of this invention in that it eliminates the need for a large, heavy so-called "rotary air lock" device. Such a device comprises a housing and a multi-vaned rotor rotating inside the housing and enabling material to flow between two different air pressure zones. As a result, the mass and weight of the entire system has been reduced and essentially a portable device has been produced. In this regard, it should be noted that the container 52 and its companion containers shown each weigh about 1500 pounds when loaded and it is difficult to manhandle containers of this weight over a rotary air lock unit.

Referring now to FIGS. 8 and 9, FIG. 8 depicts the hydraulic supply lines from the tractor or like source of hydraulic power to the hydraulic motor 8 and to the slide gate cylinder 46. FIG. 8 shows the circuit diagram indicating the electrical circuits for the solenoids 30, 32. Switch 26 is operated to turn on and off the blower 2. It is a switch of the type that is maintained in contact once depressed and the contact is broken when depressed again. Switch 26 operates solenoid 30 which in turn controls valve 11 to supply fluid to motor 8. Switch 28 operates solenoid 32 to control the position of valve 13 for delivery of fluid to the hydraulic line 48 or to hydraulic line 50. Valves 11, 13 are normally biased to the positions shown in FIG. 8 by springs 27, 29.

The three containers shown in FIGS. 1 and 2 are preferably of the size to hold approximately 1500 pounds of material. This can be handled with a loading tractor in the field. The containers are designed to be stackable and for this purpose the sides slope to the bottom creating a nesting ability as depicted by the dotted lines showing a nested container in FIG. 2. The inside of the floor of the container is sloped from side to center to the outlet hole of the container. Furthermore, in actual field use, the containers would be blocked up in the rear to create an angle of slide from back to front so as to assist in getting the material out of the container. Alternatively, several of these containers could be mounted on a grain truck having removed sides and then utilizing the hydraulic hoist in the truck to elevate the containers to create a satisfactory angle of slide from back to front. Furthermore, the containers are designed to allow four-way entry by forklift trucks. This enables to seed manufacturers to load flatbed or enclosed trailers from one direction and to allow the farmer to pick these units off of the side of the vehicle once they have arrived at his location. The container is designed to be relatively moisture-proof, and it is desirable that each container have a sealed lid.

In FIGS. 1 and 2, there is illustrated the gate mechanism and the venturi attached to one of the containers. It is contemplated that the flexible hoses or lines 10, 14 would be relatively long. For example, the length of the line 14 will be approximately 40 feet.

I claim:
1. A pneumatic conveyor for seeds comprising a discharge device, single air supply means for providing a single flow of air, a single conduit coupled to said single air supply means and to said discharge device for supplying a single flow of air thereto, said conduit being flexible over a major portion of its length, and means in said conduit for pneumatic coupling to a sidewall of a container having a supply of seeds in a manner that creates a pressure differential between the supply and the conduit to introduce said seeds into the conduit along a generally horizontal path for delivery by the flowing air to the discharge device; said means for pneumatic coupling comprising a venturi; means for removably mounting said venturi on a supply container for said seeds or particulate matter, said last-named means comprising a power driven gate for opening and closing a passageway between the supply and the venturi; and in which said conveyor discharge device causes the formation of a vortex that separates the air from the material being conveyed and discharges the material at the periphery of said device.

2. A pneumatic conveyor according to claim 1 including means on said device for selectively controlling the operation of said gate and said air supply means.

3. A method of conveying seeds comprising providing a discharge device, providing a single flow of air in a conduit coupled to an air supply means and to said discharge device for supplying a flow of air to said discharge device, and providing pneumatic coupling between a supply of seeds and said conduit in a manner that creates a pressure differential between the supply and the conduit to introduce said seeds along a generally horizontal path into the conduit for delivery by the flowing air to the discharge device; in which said conveyor discharge device causes the formation of a vortex that separates the air from the material being conveyed and discharges the material at the periphery of said device.

* * * * *